(12) United States Patent
Lemcke et al.

(10) Patent No.: US 7,822,770 B2
(45) Date of Patent: Oct. 26, 2010

(54) MATCHMAKING OF SEMANTIC WEB SERVICE BEHAVIOUR USING DESCRIPTION LOGICS

(75) Inventors: Jens Lemcke, Karlsruhe (DE); Markus Fronk, Herrenberg (DE)

(73) Assignee: SAP AG, Walldorf (DE)

( * ) Notice: Subject to any disclaimer, the term of this patent is extended or adjusted under 35 U.S.C. 154(b) by 470 days.

(21) Appl. No.: 11/604,962

(22) Filed: Nov. 28, 2006

(65) Prior Publication Data
US 2007/0294298 A1 Dec. 20, 2007

Related U.S. Application Data

(60) Provisional application No. 60/812,572, filed on Jun. 9, 2006.

(51) Int. Cl.
*G06F 7/10* (2006.01)
*G06N 5/00* (2006.01)
(52) U.S. Cl. .......................... 707/780; 707/794; 706/45
(58) Field of Classification Search ................ 707/780, 707/794; 706/45
See application file for complete search history.

(56) References Cited

U.S. PATENT DOCUMENTS

| | | | |
|---|---|---|---|
| 2004/0139095 A1* | 7/2004 | Trastour et al. | 707/100 |
| 2005/0198206 A1* | 9/2005 | Miller et al. | 709/219 |
| 2005/0234964 A1* | 10/2005 | Batra et al. | 707/102 |
| 2006/0100995 A1* | 5/2006 | Albornoz et al. | 707/3 |
| 2006/0161655 A1* | 7/2006 | Altenhofen et al. | 709/224 |
| 2006/0173987 A1* | 8/2006 | Friesen et al. | 709/223 |
| 2006/0206440 A1* | 9/2006 | Anderson et al. | 705/500 |
| 2006/0242101 A1* | 10/2006 | Akkiraju et al. | 707/1 |

OTHER PUBLICATIONS

Paolucci et. al. "Semantic Matching of Web Services Capabilities", Jun. 2002, Proceedings of the First International Semantic Web Conference on the Semantic Web, pp. 333-347.*

Li et al. "A Software Framework for Matchmaking Based on Semantic Web Technology", Summer 2004, International Journal of Electronic Commerce, vol. 8, No. 4, pp. 39-60.*

Shu et al. "Ontology-based semantic matchmaking approach", Available online Aug. 22, 2006, Advances in Engineering Software, vol. 38, Issue 1, Jan. 2007, pp. 59-67.*

Pahl et al. "Ontology Support for Web Service Processes", Sep. 2003, Proceedings of the 9th European software engineering conference held jointly with 11th ACM SIGSOFT international symposium on Foundations of software engineering, pp. 208-216.*

(Continued)

*Primary Examiner*—John R. Cottingham
*Assistant Examiner*—James E Richardson
(74) *Attorney, Agent, or Firm*—Brake Hughes Bellermann LLP

(57) ABSTRACT

A computer-implemented method includes receiving a request for a web service and comparing a description of a behavior of the requested web service to a description of a behavior of an existing web service. The description of the behavior of the requested web service and the description of the behavior of the computing service conform to a description logic. Based on logical rules of the description logic, it is determined that the description of the behavior of the existing computing service is subsumed by the description of the behavior of the requested web service.

19 Claims, 4 Drawing Sheets

OTHER PUBLICATIONS

Stollberg et al. "Semantic Web Fred—Automated Goal Resolution on the Semantic Web" Hawaii International Conference on System Sciences, Proceedings of the 38th Annual Hawaii International Conference on System Sciences (HICSS'05)—Track 4, 2005, 10 pages.*

Shen et al. "Web Service Discovery Based on Behavior Signatures" 2005, IEEE Computer Society Washington, DC, USA, SCC '05 Proceedings of the 2005 IEEE International Conference on Services Computing, vol. 01, 8 pages.*

Lemcke et al. "Expressing Semantic Service Behavior using Description Logics" Jun. 2006, In Proceedings of the Workshop on Semantics fo Business Process Management, Workshop at the 3$^{rd}$ European Semantic Web Conference, pp. 28-39.*

Agarwal, Sudhir, et al., "Automatic Matchmaking of Web Services", WWW 2006, May 23-26, 2006.

Baader, Franz, et al., "A Description Logic Based Approach to Reasoning about Web Services", WWW2005, May 10-14, 2005.

Lara, Ruben, et al., "Discovery and Contracting of Semantic Web Services", Position Paper for the Workshop on Frameworks for Semantics in Web Services, Innsbruck, Austria, Jun. 2005.

* cited by examiner

MATCHMAKING OF SEMANTIC WEB SERVICE BEHAVIOUR USING DESCRIPTION LOGICS

CROSS-REFERENCE TO RELATED APPLICATION

This application claims priority to U.S. Provisional application Ser. No. 60/812,572, filed on Jun. 9, 2006, entitled "MATCHMAKING OF SEMANTIC WEB SERVICE BEHAVIOR USING DESCRIPTION LOGICS," which is incorporated herein by reference in its entirety for all purposes.

TECHNICAL FIELD

This description relates to web services in the in semantic web and, more particularly, to matchmaking of semantic web service behavior using description logics.

BACKGROUND

Software applications may be used to provide information and/or functionality to one or more users. For example, users may implement or access a software application to obtain a stock quote or an airline reservation, or to manage aspects of a business enterprise.

Particular functions of software applications may be implemented as more or less discrete components, and may thereby be used in a variety of contexts. For instance, the example just given of software for obtaining a stock quote may be implemented in a software component that may then be deployed into many other software applications, such as, for example, a stock price charting tool or a daily stock price reporting tool. Such re-use of software application components may, among other advantages, increase the efficiency and reliability of the components themselves, and of other applications that make use of the components, as well as reducing software development and maintenance costs.

Additionally, discrete software functionality also may be provided by permitting access to the functionality to outside parties, perhaps over a computer network. In particular, a plurality of software applications may interact with one another to provide or share functionality in an efficient and reliable way while minimizing human involvement.

Certain types of software applications are known as application services. In particular, when such an application service is provided over the World Wide Web ("WWW"), it may be referred to as a web service ("WS"). A web service may be implemented, for example, such that the web service provides functionality and data to a client, according to a defined interface that governs and defines the interaction between the two parties.

Currently, users must cope with large number of web services, and they must do so in a flexible, dynamic, and efficient manner. In addition, increasingly rapid changes in market situations often force companies to adapt their business processes and to set up interoperations with other parties quickly. Thus, there is a growing need to make use of web services.

Service-oriented technology has been developed to address some of the challenges posed by these developments. For example, with the use of the web service description language ("WSDL") in conjunction with the simple object access protocol ("SOAP") and the universal description, discovery and integration ("UDDI"), software components can be accessed through, and can be communicated with, standardized interfaces and protocols. Standard interfaces and protocols increase the flexibility of companies to integrate various web services, but each task of the web service usage process still requires a manual integration activity.

A goal of semantic web services ("SWS") research has been to automate major tasks of this usage process, for example, the discovery, selection, composition, execution, and monitoring of web services. Languages, such as, the web ontology language for services (OWL-S) and the web service modeling ontology (WSMO) have been developed to try to facilitate these tasks. However, even with these tools, specialized software and algorithms are needed to interpret the semantics used to describe the tasks of the web service usage process.

SUMMARY

Thus, described herein is a semantic web service description whose formal capabilities can be further exploited, such that standard software can draw conclusions about which services are equivalent to the evaluations that must be performed during the tasks of the web service usage process. This allows standard parts of the service to be realized by standard reasoning software, which improves the robustness of the software.

As disclosed herein, a description logics (DL), which has a formal semantics, which is sufficiently expressive to describe web service behavior, and which is decidable, can be used for the representation of web service descriptions. A semantic web service description consisting of technical, behavioral, and contextual parts provides enough information for the automation of many WS usage tasks. A common feature of the tasks of discovery, selection, composition, execution, and monitoring of web services is finding service descriptions that match a request description. Therefore, the web service descriptions described herein are designed in such a way that the matching of formal service descriptions and formal request descriptions can be performed through standard subsumption reasoning.

In addition, such a general semantic web service description is extendable for later enhancements and can be integrated with other aspects of web service descriptions whose modelings are developed independently from each other. For example, the "business semantics" aspect of a web service is an aspect that could be expressed in description logics.

In a first general aspect, a computer-implemented method includes receiving a request for a web service and comparing a description of a behavior of the requested web service to a description of a behavior of an existing web service. The description of the behavior of the requested web service and the description of the behavior of the computing service conform to a description logic. Based on logical rules of the description logic, it is determined that the description of the behavior of the existing computing service is subsumed by the description of the behavior of the requested web service.

In another general aspect, a system for matching a requested web service with an existing web service can include a generator, a repository, and a reasoner. The generator is configured for generating a description of a behavior of a requested web service for a computing service, where the description of the behavior of the requested web service conforms to a description logic. The repository contains a description of a behavior of the existing web service, where the description of the behavior of the existing web service conforms to the description logic. The reasoner is coupled to the repository and is configured for comparing the description of the behavior of the requested web service to the description of the behavior of the existing web service and also is configured for determining if the description of the behavior of the service is subsumed by the description of the behavior of the requested web service according logical rules of the description logic.

Implementations can include one or more of the following features. For example, determining that the description of the behavior of the existing computing service is subsumed by the description of the behavior of the requested web service can be performed by a Racer reasoner, a RacerPro reasoner, a Pellet reasoner, a FaCT reasoner, a FaCT++ reasoner, a MSPASS reasoner, a Celebra Engine reasoner, a CEL reasoner, a Jena reasoner, a Jess reasoner, or a KAON2 reasoner.

The description of the behavior of the requested web service can include a first sequence of first inputs, and the description of the behavior of the existing web service can include a second sequence of second inputs. In this implementation, determining that the description of the behavior of the existing web service is subsumed by the description of the behavior of the requested web service can include: 1) determining, based on logical rules of the description logic, that the first inputs subsume the second inputs, and 2) determining, based on the logical rules of the description logic, that a sequential order of a set of second inputs in the second sequence is identical to a sequential order of a set of first inputs in the first sequence, where the sequentially ordered first inputs are equivalent to the sequentially ordered second inputs.

The description of the behavior of the request can include a first sequence of first outputs, and the description of the behavior of the service can include a second sequence of second outputs. In this implementation, determining that the description of the behavior of the existing web service is subsumed by the description of the behavior of the requested web service can include: 1) determining, based on logical rules of the description logic, that the second outputs subsume the first outputs; and 2) determining, based on logical rules of the description logic, that a sequential order of a set of first outputs in the first sequence is identical to a sequential order of a set of second outputs in the second sequence, where the sequentially ordered second outputs are equivalent to the sequentially ordered first outputs.

The description of the behavior of the requested web service can include a first sequence of first inputs, and the description of the behavior of the existing web service can include a second sequence of second inputs. In this implementation, determining that the description of the behavior of the existing web service is subsumed by the description of the behavior of the requested web service can include determining, based on logical rules of the description logic, that the second sequence is subsumed by the first sequence.

The description of the behavior of the requested web service can include a plurality of first inputs, and the description of the behavior of the existing web service can include a plurality of second inputs. In this implementation, determining that the description of the behavior of the existing web service is subsumed by the description of the behavior of the requested web service can include determining that the plurality of the first inputs includes the plurality of second inputs.

The description of the behavior of the requested web service can include a plurality of first outputs, and the description of the behavior of the existing web service can include a plurality of second outputs. In this implementation, determining that the description of the behavior of the existing web service is subsumed by the description of the behavior of the requested web service can include determining that the plurality of the second outputs includes the plurality of first inputs. Also, the description of the behavior of the requested web service can include a plurality of first inputs, and the description of the behavior of the existing web service can include a plurality of second inputs, and then determining that the description of the behavior of the existing web service is subsumed by the description of the behavior of the requested web service can include determining that the plurality of the first inputs includes the plurality of second inputs and determining that the plurality of the second outputs includes the plurality of first inputs.

The description logic can include an OWL Web Ontology Language description logic. The description of the behavior of the requested web service can be received through a wide area network. Receiving the request for the web service can include receiving the description logic description of the behavior of the requested web service at a reasoner in the client. A description logic description of the behavior of the requested web service in a client can be generated.

The methods described herein can include: 1) comparing the description of the behavior of the requested web service to a plurality of descriptions of behaviors of different existing web services, where the descriptions of the behaviors of the existing web services conform to the description logic; and 2) determining which of the descriptions of the behavior of the existing web services are subsumed by the description of the behavior of the requested web service based on the logical rules of the description logic.

The description logic can include an OWL Web Ontology Language description logic, where the description of the behavior of the requested web service includes first inputs and first outputs, where the description of the behavior of the existing web service includes second inputs and second outputs, and where determining that the description of the behavior of the existing web service is subsumed by the description of the behavior of the requested web service includes determining that first inputs include the second inputs and determining that the second outputs include the first outputs.

A client adapted to implement functionality provided by the existing web service can be used, where the existing web service is provided by a server remotely located from the client and coupled to the client through a computer network.

The details of one or more implementations are set forth in the accompanying drawings and the description below. Other features will be apparent from the description and drawings, and from the claims.

DETAILED DESCRIPTION

Figure 1:
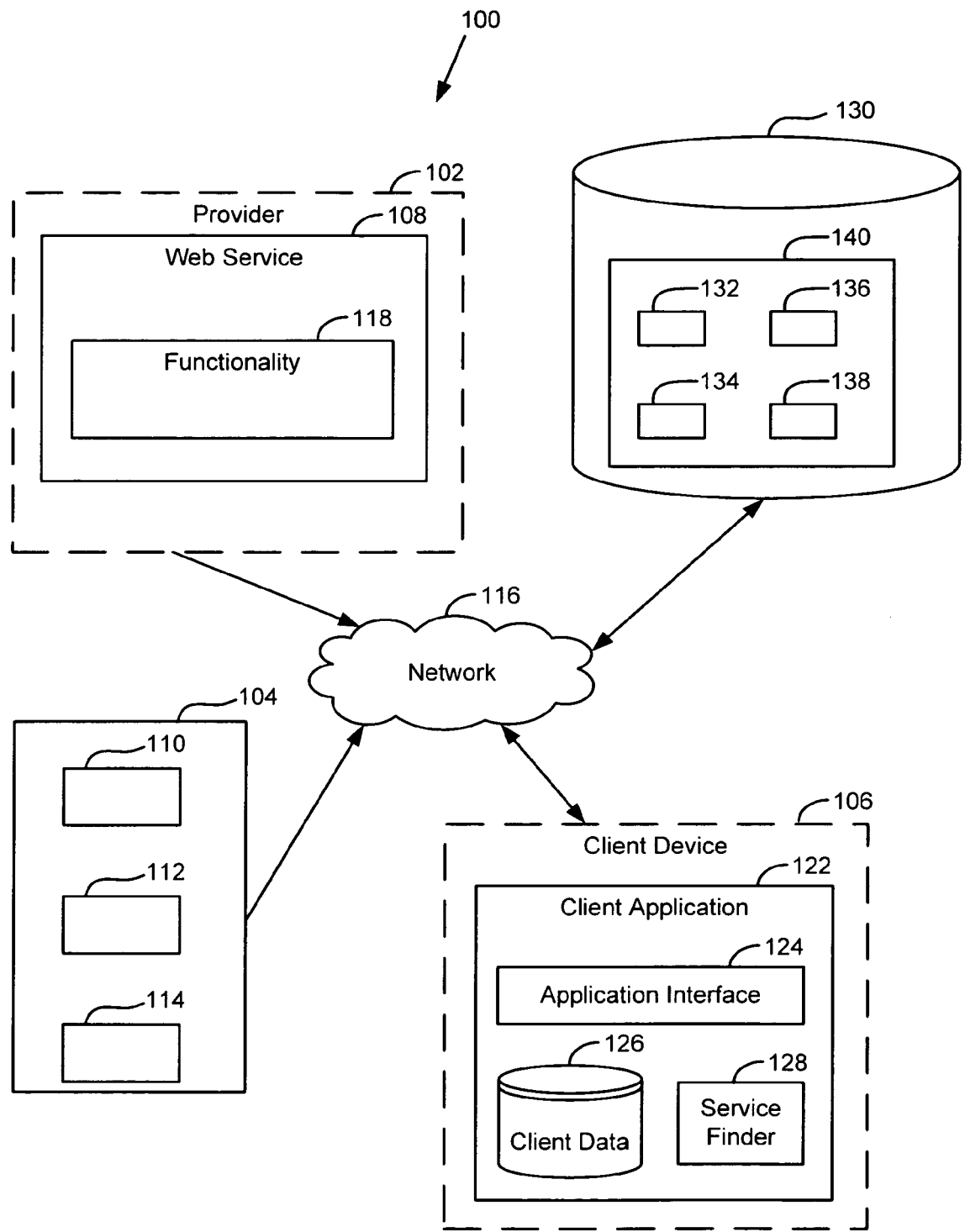
FIG. 1 is a block diagram of a system for accessing and evaluating a web service.

FIG. 1 is a block diagram of a system 100 for providing one or more a web services to a user. The system includes a plurality of service providers 102 and 104, which can be accessed by a client 106. The service providers 102 and 104 can be servers that store and provide access to one or more web services 108, 110, 112, and 114 that can be operated by or for the benefit of the client 106. For example, the service providers 102 and 104 can include web servers that host web pages that can be accessed by the client 106 through a network 116, e.g., the Internet, a Wide Area Network (WAN) or a Local Area Network (LAN). The client device 106 may represent virtually any type of computing device, including a laptop computer, a personal digital assistant (PDA), a mobile phone, or a desktop computer.

In the example of FIG. 1, a service provider 102 can implement a web service 104, in order to provide a functionality 118. The functionality 118 may thus be provided over the network 116, for use by a client 106 that is running a client software application 122.

In FIG. 1, the provider 102 may be any entity that is willing and able to provide the functionality 118. For example, the provider 102 may be a business enterprise that wishes to provide the functionality 118 for profit, or for a convenience of customers or suppliers of the business enterprise. For example, the provider 102 may be a retail store that exposes part of its inventory management software as the web service 108, so that a supplier of the retail store may access the functionality 118 and determine whether a supplied item is in need of re-ordering. In this way, the provider 102 may expose relevant inventory data to a particular supplier of that inventory, while maintaining other inventory data in confidence. In this scenario, the supplier can operate as the client 106 that operates a client application 124 (e.g., an inventory management application) that interfaces with the web service 108, such that it can serve the needs of the retail store. The client application 122 may rely on an application interface 124, so that it can communicate and interoperate with a web service 108 offered by a provider. Once a connection between the client application 122 and the web service 108 has been established the client application 122 can provide client data 126 to the web service or receive data from the web service to store as client data 126. For example, in the example described above, the client application 122 may provide data to the web service 108, which can be passed on to the retail store to inform the store when the desired item can be supplied, the price of the item, etc. Many other examples of the provider 102 exist.

The web service 108, then, may be any one of a number of web services being operated by the provider 102, or may be operated in isolation, or may be operated jointly by a number of providers. For example, the a different web service 110, 112, or 114 could be provided by a different service provider 104 to perform the functionality 118 for the client 106 or the functionality 118 may be provided by a combination of web services 108, 110, 112, and 114 offered by various providers 102 and 104. Although the example of a web service is provided, it should be understood that the concepts described herein with respect to the web service 108, 110, 112, and 114 also may be applied to other types of software applications, such as, for example, software agents, or application(s) using the common object request broker (CORBA) and/or distributed common object model (DCOM), or other interacting software applications.

In the example system 100, it is assumed that the client application 122 is generally operable to discover, request, and interact with certain web service 108, 110, 112, and 114. Where the client application 122 is operable to interact with such other web service(s), the client application 122 may, for example, format a request for a functionality 118 of such a web service 108, using the Simple Object Access Protocol (SOAP) and/or Extensible Mark-up Language (XML) formatting. Then, the client application 122 may send the formatted function request to the other web service, using a mutually-agreeable communications protocol, such as, for example, the Hyper-Text Transfer Protocol (HTTP) or the Simple Mail Transfer Protocol (SMTP). In this way, the other service receives a request to which that service may respond by reading and processing the incoming XML requests with respect to the logic of whatever functionality that the service is providing. The functionality and/or data may then be provided in one or several outgoing response that is (are) formatted using SOAP and XML and that is (are) understandable by the client application 112.

To discover a particular web service 108 to provide the desired functionality 118 from all the various web services available through the network 116 the client application 122 may access a directory of services, such as, for example, the Universal Description, Discovery, and Integration ("UDDI") directory, a distributed directory, or registry designed to allow parties to find a given service/functionality available through the network 116. The UDDI may use a language known as the Web Services Description Language ("WSDL"), which is an XML-formatted language designed to describe web service interfaces.

The system 100 also can include a service registry repository 130 that can store information 132, 134, 136, and 138 about the web services 108, 110, 112, and 114 offered by the service providers 102 and 104 to the client 106. For example, each collection of information 132, 134, 136, and 138 stored in the repository 130 can contain a description of a respective service 108, 110, 112, and 114. A service finder 128 within the client 106 then can use the information stored in the repository 130 to locate, evaluate, and select one or more appropriate web services that can perform a functionality 118 requested by the client 106. When the descriptions are expressed in a formal language, the discovery and selection of web service(s) 108, 110, 112, or 114 that are appropriate for responding to the client's request can be automated to a certain extent.

In one example, the repository 130 can include a UDDI registry 140, and the service providers 102 and 104 can register information 132, 134, 136, and 138 about their respective services 108, 110, 112, and 114 in the UDDI registry. The UDDI registry 140 can provide a number of registry services including traditional White Pages for looking up a web service by name, traditional Yellow Pages for looking up a web service by topic, and Green Pages for more generic searches based on the desired functionality 118 of a web service 108, 110, 112, or 114. Registry hosts that provide UDDI services typically operate a service known as a UDDI Business Registry (UBR) that can be accessed both for service providers 102 and 104 to publish descriptive information into the UBR and for a client 106 to request information about a web service from the UBR. The repository 130 can respond to a request for information from the client 106 by providing information 132, 134, 136, and 138 about the respective web services 108, 110, 112, and 114 to the client.

The client 106 can use the information about the web services gained from the repository 130 (which may include details about the location of the web services) to select an appropriate web service 118 from the available web services offered by the service providers 102 and 104. The client 106 can then invoke the appropriate web service 118 with a direct call to the web service. In one implementation, the client 106 can make a SOAP call to the service provider 104 to invoke the web service 118 (along link 148).

The UDDI mechanisms and services attempt to provide a semantic annotation of web service technologies and standards to facilitate discovery of appropriate services and matchmaking between a requests from a client an available service. However, the UDDI discovery mechanism generally does not promote automatic matchmaking between requests from the service finder 128 on the client 106 for a particular functionality 118 and an appropriate services 108, 110, 112, or 114. Other ways of describing services and requests include using language descriptions using ontologies for the description of behavioral aspects of services. However, for matching of requests and services described using language descriptions using ontologies special algorithms generally have to be developed.

Figure 2:
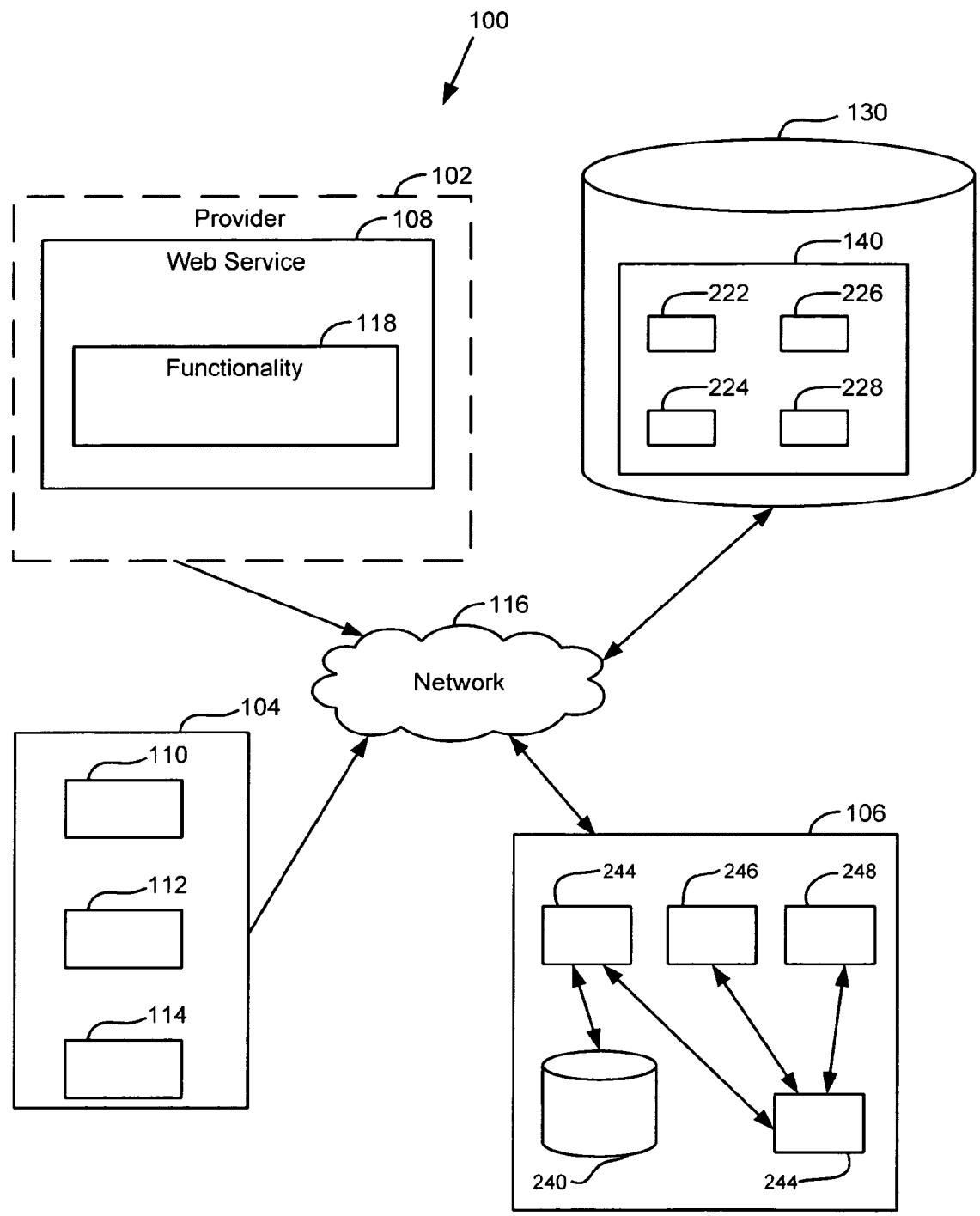
FIG. 2 is a block diagram of a system for accessing and evaluating a web service.

FIG. 2 is a schematic block diagram of a system 200 in which the behavior of web services 108, 110, 112, and 114 and requests from a client 106 for a web service are formally described with a description logics (DL), such that web services that can provide a desired functionality 118 can be located automatically by the client. In particular, descriptions 222, 224, 226, and 228 of corresponding web services 108, 110, 112, and 114 can be expressed with a description logics. In addition, requests from the client 106 can also be expressed with a description logics. The client 106 can include a repository device 240 (e.g., a random access memory, magnetic media or optical media) for storing information, a processor 242, an operating system 244, and a standard reasoner 246 that can be used for evaluating the results of a matchmaking between descriptions of requests for functionalities 118 and the services 108, 110, 112, and 114 that provide the functionality, where both the requests and the services are expressed in a description logics. The reasoner 246 therefore can receive a description of the request and can receive descriptions of web services and then can compare the description of the request to the description(s) of the web service(s) and then can compare the descriptions to determine if the request matches one or more web services. The client 106 also may include a generation engine 248 that can generate descriptions of requests and/or web services using a description logics.

Alternatively, the descriptions of web services 108, 110, 112, and 114 need not be stored on the repository 240, but descriptions of the web services can be received by the client from a remote location and converted into a description logics formalism locally. In another implementation, the reasoner 246 need not be located in the client 106 but may be located somewhere else in the networked system 200 (e.g., on a server in the system).

Automated discovery and matchmaking between web services requests for web services can be realized using a standard reasoner 246, such as, for example, Racer, RacerPro, Pellet, FaCT, FaCT++, MSPASS, Celebra Engine, CEL, Jena, Jess, or KAON2. When the description logics is used to express services and requests, web services matching a request can easily be determined by the subsumption mechanism as described in more detail below.

To understand how web services and requests are modeled with the description logics it is helpful to consider the behavioral patterns that can appear with respect to web services, which patterns are modeled in the description logics. Messages exchanged by web services can be distinguished in incoming and outgoing messages containing either parameters to be processed by the web service (i.e., inputs) or parameters to be provided by the web service (i.e., outputs). The web service behavior can be modeled as having three aspects: the existence of inputs and outputs (interactions); the sequence in which inputs and outputs occur during operation of the web service; and control constructs representing the allowed order of interactions. Each of these aspects is described below in terms of its significance with respect to the behavior of a web service.

From the point of view of a client 106 that requests a functionality 118, inputs can be provided to the web service, and outputs must be received from the web service. From the point of view of a web service provider 102, the described inputs are required, and the outputs are provided. The semantics of these different interpretations of the existence of interactions is discussed in more detail below. For modeling purposes, the existence of inputs and outputs is initially considered individually before being consolidated with other aspects. A web service can consist of several inputs, outputs, or most commonly a combination of both. However, the mere existence of interactions does not provide information about the ordering of interactions.

The order of interactions can be specified by defining a sequence of the interactions' appearance. In one example implementation, a special order of interactions may need to be defined when an internal state of the web service is triggered by an interaction with an external agent, and the internal state must be reached before another interaction can be processed by the service. Although this implicit order of interactions may not be obvious from viewing only externally visible public processes of the web service, the implicit order nevertheless may be necessary for the successful execution of the operation of the service. For example, in a web service that takes an order and a payment for an item, a user may login, provide information specifying his order, provide credit card information to pay for the order, and receive a confirmation of the order and the payment, and then logout. However, before providing the confirmation, the web service may require that the credit card information be validated and may require that an internal state acknowledging the validity of the credit card information be reached before providing the confirmation. Thus, if the user logs out after providing the order and credit card information but before this internal state is reached, the confirmation will not be processed. This requirement that interactions must be performed in a pre-determined order by a service may be a necessary condition to finding a match for a request. Therefore, this requirement on the sequence of interactions can be made explicit, and the sequence can be defined either between inputs or outputs or between both inputs and outputs.

The third behavioral aspect besides the existence of interactions and the sequence of interactions, is the aspect of control constructs that describe special derivations from the basic sequence. For example, several basic control patterns based on an analysis of existing workflow management systems and workflow languages can be identified and described and can be used to model a common set of service behavior constructs. The basic patterns can include a "sequence," pattern that requires that certain workflows be performed in a particular order (as described above). Other basic patterns are described below.

A "parallel split" pattern can express the concurrency of interactions. This means that the interactions described as concurrent can appear in any order. They only have to meet other sequential requirements that could be specified, for example, when another interaction is defined to occur before the parallel split. An example use case from a web service provider's point of view could be as follows: after entering necessary login information a user of the web service must enter both credit card information and address information. The sequence of entering the credit card and address information, however, is of no importance for the service functionality, and it is only required that both interactions have to appear after the login. Thus, the parallel split pattern describes a pattern in which certain interactions occur in any order, so long as they all occur after a triggering interaction.

An "exclusive choice" pattern can express the requirement that when multiple interactions are possible that only one of the interactions can be selected. For example, in a web service that verifies the identity of a user, the web service may request either a social security number or an account number, but once either the social security number or the account number have been entered by the user the web service may proceed to the next interaction without offering the possibility of entering the other identification number.

Another basic pattern is "synchronization" in which two or more activities that may execute in any order or in parallel are synchronized, and the execution of the following activities is not performed until all these preceding synchronized interactions have been completed. Still another basic patter is "simple merge" where the workflow waits for one among a set of activities to be completed before proceeding. It is assumed that only one of these activities will be executed; typically, these activities are on different paths and stem from an exclusive choice.

Having described a number of elements that represent behavioral aspects of services and their significance with respect to the order of interactions, the semantics of these elements is now considered with regard to the matching of services. Matching of services to a request can be a common task in the SWS usage process. Here, the semantics due to which a service is matched to a request is described using the previously introduced elements.

The decision whether a web service can be matched to a request depends on the previously described behavioral aspects of the service and the request. Descriptions 222, 224, 226, and 228 of respective web services 108, 110, 112, and 114 and of requests can be stored in an external repository 130 or within a local repository 240, can be retrieved from a network 116, or can be generated by a generation engine 248. However, whether a matching exists often cannot be determined easily by simply comparing the existence of these constructs of the request and the service, because the semantic behind the constructs is quite complex with respect to web services. Rather, each aspect described by a service request, R, is analyzed with respect to its effects on the fulfillment by a service, S. We use description logics in such a way that a service S fulfills the requirements of a request R when $$R \supseteq S \tag{1}$$

can be asserted. The semantics of the behavioral aspects of the request and of the service are modeled in description logics to satisfy this equation. This means that the behavioral constructs can be described in such a way that matching services can be identified when equation (1) is satisfied.

As indicated above, the existence of inputs described in a request may have a different effect on a web service's ability to assert $R \supseteq S$ than the existence of outputs may have. The description logics expression representing inputs of a request R and the inputs of a service S can be written as $I_R$ and $I_S$, respectively. The respective outputs can be written as $O_R$ and $O_S$, respectively. $I_R$ describes the maximum set of inputs that can be provided by the environment. However, because a web service need not use all the inputs provided, a web service that delivers the requested functionality while fewer inputs than provided still fulfills the request. This can be described by equation (2) below:

$$\text{Inputs: } I_R \supseteq I_S \tag{2}$$

The set of outputs specified by the environment, which is defined as $O_R$, is, on the other hand, mandatory, and it specifies the minimum set that must at least be provided by the web service's set of outputs, $O_S$, to satisfy the request for the desired functionality. This relationship can be defined by equation (3) below:

$$\text{Outputs: } O_R \supseteq O_S \tag{3}$$

The sequence describing the order of inputs and outputs specified by a service request can be defined as $\text{Seq}_R$, which must be met by the sequence of a matching service, $\text{Seq}_S$, in order to satisfy $R \supseteq S$, and equations (2) and (3) additionally must still hold. This means that a web service does not necessarily have to consume an input, even if it is described in the sequence, $\text{Seq}_R$. This condition can be discovered by a standard reasoner. However, when a service consumes an input that is described in a special order as specificed in $\text{Seq}_R$, the input must at least appear with the same sequential constraints in $\text{Seq}_S$. In contrast, the requested outputs must always be provided by the service, but additional, non-requested outputs provided by the service S (i.e., those outputs that are not defined in $O_R$) can be part of the sequence $\text{Seq}_S$ at any position in the sequence. This condition can be expressed as $$\text{Sequence: } \text{Seq}_R \supseteq \text{Seq}_S. \tag{4}$$

The semantics related to a parallel split pattern can be expressed as follows: a request that defines a parallel split pattern that occurs between two interactions (e.g., $I_1$ and $O_1$) explicitly states that the order of these interactions is not relevant. This means that for a service to fulfill the request, the service can either specify the parallelism as well or can define an order of the interactions involved. Both a service stating the sequence "$I_1$ and then $O_1$" and a service stating the sequence "$O_1$ and then $I_1$" match the request. The identification of possible matches should consider this specially, because it cannot be derived simply from a one-to-one mapping of control constructs. A service does not necessarily have to have the same control construct as the request for a match between the service and the request to exist. The aspects of existence, sequence, and the control constructs can be combined in any combinations. The previously-described characteristics of each of the aspects are still considered for the matching when combined to represent a more complex behavior.

Elements of web services' behavior and their semantics with regard to the matching of web services 108, 110, 112, and 114 with requested functionalities 118 have been described above. Now, the description logics constructs that represent the previously-discussed elements and their semantics are described. These description logic constructs provide the basis for automated reasoning and matching.

The description logics approach to matchmaking between web services and requested functionalities (e.g., an OWL-DL approach) provides decidability and the ability to integrate with other semantic web technologies to facilitate the expandability of the web service descriptions. The matching of requests and services can be represented by a subsumption relation between the description logics constructs of services and requests, as explained, for example, with respect to equation (1). Given several services annotated with the description logics constructs defined below for describing the behavioral aspects of the services, standard reasoners can be exploited to infer this classification (i.e., the subsumption relation between the service and the request). The following constructs are modeled and developed to be used with the conception of classification. Services that match a request in terms of the aspects described above can be automatically identified and classified as subsumed by the service request. Requests, services, and interactions can be modeled as classes, and the behavioral aspects can be expressed by special properties representing the relationships between classes.

To describe the semantics of the existence of interactions the existence property "has" is used. The "has" property can colloquially be interpreted as: "A service has the following inputs and outputs!" Due to the fact that inputs and outputs have different semantics for fulfillment, they also can be modeled in a different way. The description logics expression for a set of inputs $I_1, I_2, \ldots, I_n$ for a request, R, or service, S, can be represented through the inputs combined by the "union of" specifier, such that equation (2) is satisfied. The set for a service S and a request R. respectively, therefore can be defined as $$I_{S/R} = (I_1 \cup I_2 \cup \ldots \cup I_n). \tag{5}$$

A request, R, providing several inputs then can be described by defining a "has" relationship with the relevant set, as follows:

$$R = \exists \text{has} \cdot I_R = \exists \text{has} \cdot (I_1 \cup I_2 \cup \ldots \cup I_n). \tag{6}$$

A service, S, described as $S = \exists \text{has} \cdot (I_1 \cup I_2 \cup \ldots \cup I_m)$ where $m \leq n$ therefore can be identified as being adequate to fulfill the request, R, because the condition $R \supseteq S$ is satisfied. Services requiring more inputs (m>n) do not satisfy this condition. Outputs, in contrast, can be enumerated using the "intersection of" operator for representing the semantics in equation (3). The description logics expression for a set of outputs $O_1, O_2, \ldots O_n$ therefore can be defined as follows:

$$O_{S/R} = (O_1 \cap O_2 \cap \ldots \cap O_n). \tag{7}$$

A request that requires several particular outputs then can be described by defining a has relationship with the relevant set as follows:

$$R = \exists \text{has} \cdot O_R = \exists \text{has} \cdot (O_1 \cap O_2 \cap \ldots \cap O_n). \tag{8}$$

Thus, a service, S, described as $S = \exists \text{has} \cdot (O_1 \cap O_2 \cap \ldots \cap O_m)$, where $m \geq n$ can be identified as a match for the request, because the condition $R \supseteq S$ is satisfied, but services providing fewer outputs (i.e., m<n) are not considered to fulfill the request, R. The more common case when a service includes both inputs and outputs can be accommodated by the combination of equations (5) and (7). These concepts are combined using the "intersection of" operator, and the description logics construct of the combined interactions can be written as $IO_{S/R}$, which is described with following equation:

$$IO_{S/R} = I_{S/R} \cap O_{S/R} = (I_1 \cup I_2 \cup \ldots \cup I_n) \cap (O_1 \cap O_2 \cap \ldots \cap O_m). \tag{9}$$

Requests that provide several inputs and that require several outputs then can be described by defining a relationship similar to the cases shown in equations (6) and (8), as follows:

$$R = \exists \text{has} \cdot ((I_1 \cup I_2 \cup \ldots \cup I_n) \cap (O_1 \cap O_2 \cap \ldots \cap O_m)). \tag{10}$$

This expression facilitates reasoning over both the constraints defined in equations (2) and (3).

The sequence of inputs and outputs can be described through an ordering property, and the succession of several interactions can be represented by nesting the ordering property. The nested expressions can be combined in a similar manner to the manner in which the existence of inputs and outputs can be combined. Consecutive inputs can be combined with the "union of" operator, and consecutive outputs can be combined with the "intersection of" operator. Thus, required sequences of inputs and outputs in requests, R, and services, S, can be described as shown in equations (11) and (12) below:

$$\text{Seq}_R = \forall \text{then} \cdot (I_1 \cup (\forall \text{then} \cdot (I_2 \cup (\forall \text{then} \cdot (\ldots \cup (\forall \text{then} \cdot (I_n)))))). \tag{11}$$

$$\text{Seq}_R = \exists \text{then} \cdot (O_1 \cap (\exists \text{then} \cdot (O_2 \cap (\exists \text{then} \cdot (\ldots \cap (\exists \text{then} \cdot (O_n)))))). \tag{12}$$

The semantics of a "parallel split" in an example case having three existing interactions can be expressed as follows:

$$\text{Seq}_R = \forall \text{then} \cdot (I_1 \cup ((\exists \text{then} \cdot (I_2 \cup (\exists \text{then} \cdot I_3))) \cup (\exists \text{then} \cdot (I_3 \cup (\downarrow \text{then} \cdot I_2))))) \tag{13}$$

$$\text{Seq}_R = \forall \text{then} \cdot (I_1 \cup ((\exists \text{then} \cdot (O_2 \cap (\exists \text{then} \cdot O_3))) \cup (\exists \text{then} \cdot (O_3 \cap (\exists \text{then} \cdot O_2))))) \tag{14}$$

Equations (13) and (14) describe the concurrency of the second and the third interactions, but indicate that the sequence of the occurance is not relevant. Both a service, $S_1$, that has the second interaction before the third interaction and a service, $S_2$, that has the second interaction after the third interaction are identified as matching the request, R (i.e., in both situations $R \supseteq S$ is satisfied).

As explained above, a service behavior can include an existence aspect and a sequential ordering aspect. The description logics expression for the service behavior description therefore is the combination of both aspects (and is represented by the "intersection of" operator). The behavioral aspects of requests, R, and services, S, can be described as follows. Assuming a request that describes three sequentially ordered inputs, $I_1, I_2, I_3$ (i.e., first $I_1$, then $I_2$, then $I_3$) is represented by the description logics construct:

$$R = \exists \text{has} \cdot (I_1 \cup I_2 \cup \ldots \cup I_n) \cap \forall \text{then} \cdot (I_1 \cup (\forall \text{then} \cdot (I_2 \cup (\forall \text{then} \cdot I_3)))), \tag{15}$$

the services described with the same description logics expressions can be identified as matches by verifying that they satisfy the equation $R \supseteq S$. An advantage of using this formalism, is that this inference can be performed using standard reasoners. Outputs can be described accordingly, by combining the existence and sequence constructs for outputs.

Figure 3:
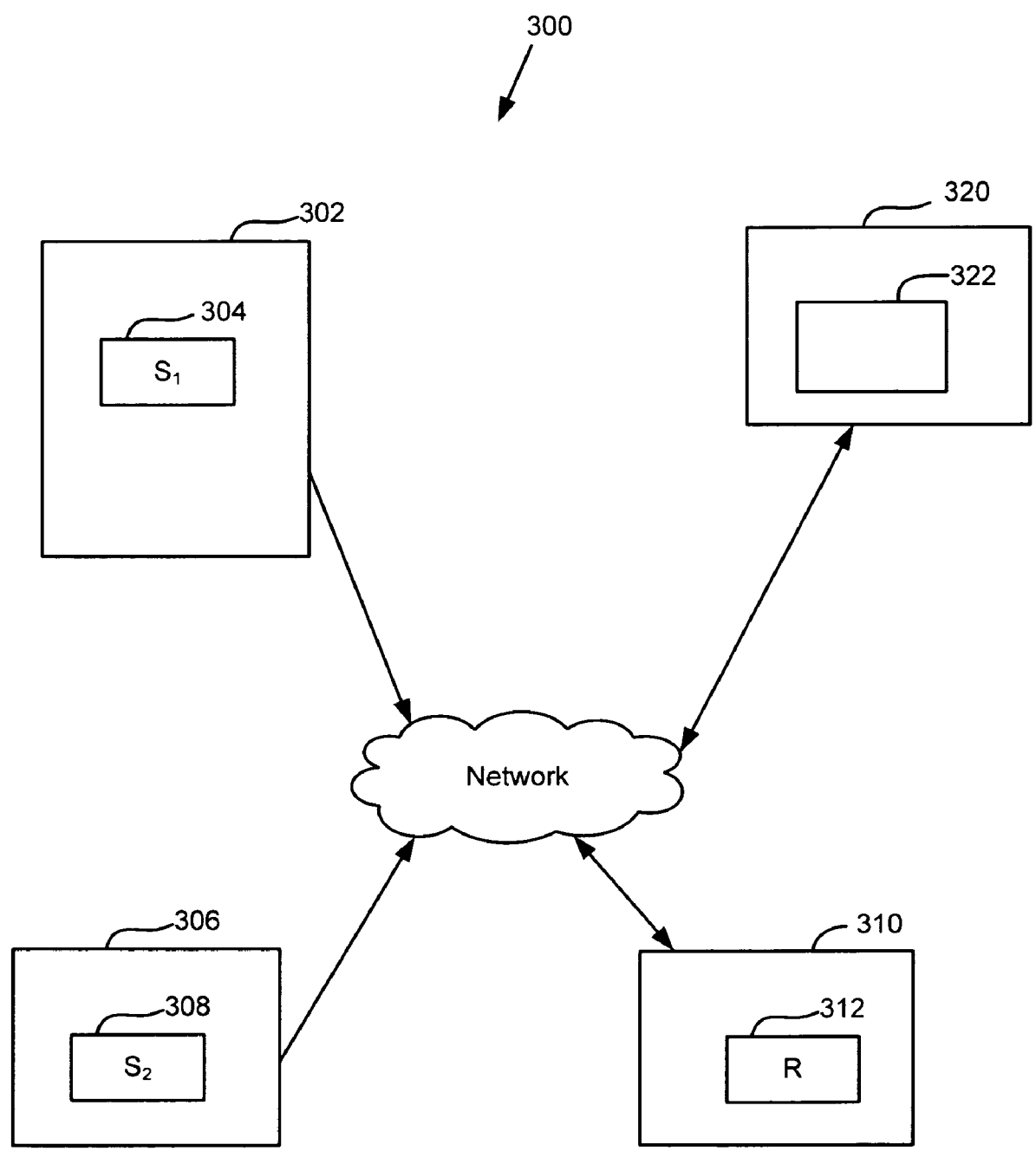
FIG. 3 is a block diagram of a system for accessing and evaluating a web service.

As shown in FIG. 3, a first service provider 302 may offer a first web service, $S_1$, 304, and a second service provider 306 may offer a second web service, $S_2$, 308. A client 310 can formulate a request, R, 312 for a service and the request can be routed to a LAN server 320 that include a standard reasoner 322 for evaluating a matching between the request, R, and the services, $S_1$ and $S_2$. The services 304 and 308 also can be accessed by the server 320. The request 312 and the services 304 and 308 are modeled with description logics-constructs, such that the question of a matching between the request and the various services 304 and 308 can be evaluated by the standard reasoner 322.

The behavioral aspects of the request 3 12 and the possible services 304 and 308 can be described with OWL-DL, and existing inference mechanisms can be used to draw conclusions about the matching of the services 304 and 308 with the request 312. By using existing standard reasoners, the code robustness can be improved because the formal semantics of description logics facilitates the separation of the model of aspects of the web services from its interpreting application.

In one example case of the techniques described above, a user may formulate a request, R, for a web service that provides a functionality for processing an order (e.g., an "Ordering" service). The requested functionality may require that the service allow a user to login to the web service, input information about an order, input information about himself (the user), and provide an order confirmation as an output. Furthermore, a "Store" service, $S_1$, 304 can be provided by first service provider 302, where the Store web service requires login information and order information as inputs and provides a welcome message upon successful login and a confirmation message for the order as outputs. A "Fraud" service, $S_2$, 308 can be provided by a second service provider 306, where the Fraud web service requires login information, user information, and order information as inputs and provides a confirmation message as and output. To evaluate a potential matching between R and $S_1$ and between R and $S_2$ the following corresponding description logics-constructs can be defined.

$R$=Ordering=∃has·((login∪order∪userData)∩(conf))

$S_1$=Store=∃has·((login∪order)∩(wMsg∩conf))

$S_2$=Fraud=∃has·((login∪order∪userData)∩(conf))

A reasoner 322 that is given these service descriptions can output its result to determine whether any of the services match the request. In this example, once the reasoner 322 has analyzed the services according to a subsumption reasoning, the reasoner would conclude that both the Fraud service 308 and the Store service 304 are subsumed by the Ordering service, and therefore a matchmaking exists between both R and $S_1$ and R and $S_2$. Therefore, the Fraud service and the Store service are displayed as subsets of the Ordering service.

However, if the service behavior is also considered when identifying appropriate services, the previous expressions of R, $S_1$, and $S_2$ are extended with the introduced description logics-constructs to define the allowed sequence of interactions. An important constraint in the request may be that the order information and user information are not provided until after a login has occurred. The Store service 304 may satisfy this requirement, but the Fraud service may require input of the user data before the login information is input. The corresponding description logics-constructs for such a request and services are defined as follows.

$R$=Ordering=∃has·((login∪order∪userData)∩
 (conf))∩∀then·(login∪(∃then·(order∪(∃then·
 (userData∩(∃then·(conf)))))))))

$S_1$=Store=∃has·((login∪order)∩(wMsg∩
 conf))∩∀then·(login∀then·(wMsg∪(∃then·(or-
 der∩(∃then·(conf))))))))))

$S_2$=Fraud=∃has·((login∪order∪userData)∩
 (conf))∩∀then·(login∪(∃then·(order∪(∃then·
 (userData∩(∃then·(conf)))))))))

When the reasoner 322 considers these additional service behavior descriptions, the result inferred by the reasoner may conclude that only the Store service is a subset of the Ordering service, and that the Fraud service is not a subset of the Ordering service because the Fraud service does not follow the allowed order of interactions.

Thus, web service behavior, including the existence of interactions, the sequence of interactions, and the concurrency of the interactions, can be described using OWL-DL, and the use of DL as a descriptive element promotes robustness, extendability and integrability of the description of service behavior aspects.

Based on the OWL-DL expressions given for the services, and their evaluation by the subsumption-reasoning of a standard reasoner, the task of finding web services matching the technical aspects of a requested functionality (i.e., the required inputs and outputs) and the behavioral aspects of the functionality (i.e., the causal constraints over inputs and outputs) can be automatically executed. Using the technique described for the matchmaking task, there is no additional application logics needed.

Figure 4:
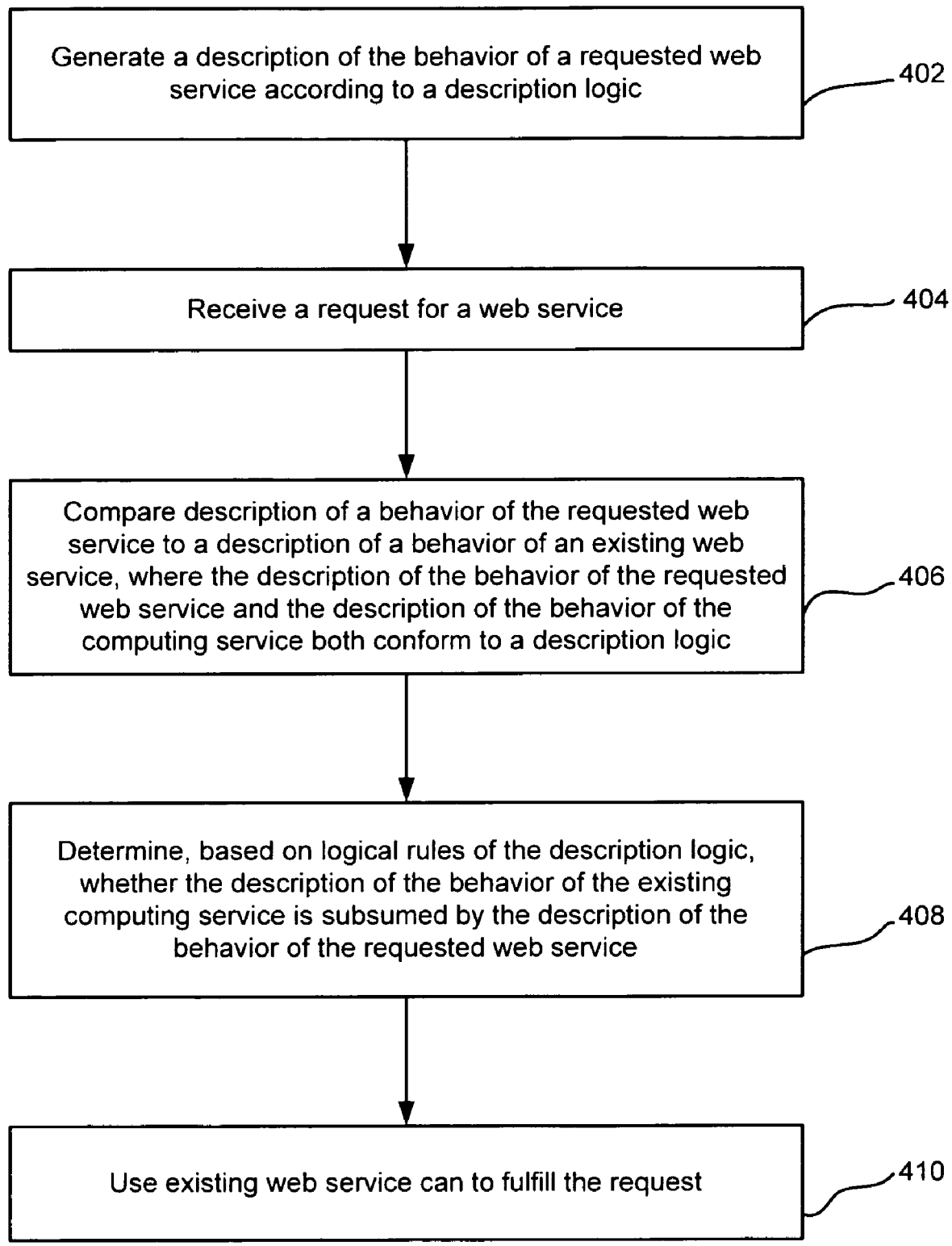
FIG. 4 is a flow chart of a process for matching a requested functionality with a web service.

FIG. 4 is a flow chart of a process 400 for matching a requested functionality with a web service. In the process 400, a description of the behavior of a requested web service can be generated according to a description logic (step 402).

A request a web service is received (e.g., through the Internet or at a client that generated the description of the request) (step 404). The description of a behavior of the requested web service is compared to a description of a behavior of an existing web service (step 406), and the description of the behavior of the requested web service and the description of the behavior of the computing service both conform to a description logic. As a result of the comparison it can be determined, based on logical rules of the description logic, whether the description of the behavior of the existing computing service is subsumed by the description of the behavior of the requested web service (408). If the description of the behavior of the existing computing service is subsumed by the description of the behavior of the requested web service, the existing web service can be used by the client to fulfill the request (410).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method comprising:
   receiving a request for a web service;
   comparing a description of the requested web service, the description including a first input sequence that includes inputs to the requested web service that occur during operation of the requested web service, in an ordering indicated by the first input sequence, and/or including a first output sequence that includes outputs from the requested web service that occur during operation of the requested web service, in an ordering indicated by the first output sequence, to a description of an existing web service, the description including a second input sequence that includes inputs to the existing web service that occur during operation of the existing web service, in an ordering indicated by the second input sequence, and/or a second output sequence that includes outputs from the existing web service that occur during operation of the existing web service, in an ordering indicated by the second output sequence, wherein the description of the requested web service and the description of the existing web service conform to a description logic;
   determining, based on logical rules of the description logic, that the second input sequence in which the inputs occur during operation of the existing web service is subsumed by the first input sequence in which the inputs occur during operation of the requested web service or determining, based on logical rules of the description logic, that the second output sequence in which the outputs occur during operation of the existing web service is subsumed by the first output sequence in which the outputs occur during operation of the requested web service;
   based on the determination that the second input sequence in which the inputs occur during operation of the existing web service is subsumed by the first input sequence in which the inputs occur during operation of the requested web service or based on the determination that the second output sequence in which the outputs occur during operation of the existing web service is subsumed by the first output sequence in which the outputs occur during operation of the requested web service, selecting the existing web service; and
   fulfilling the request with the selected existing web service.

2. The method of claim 1, wherein the determination that the second input sequence in which the inputs occur during operation of the existing web service is subsumed by the first input sequence in which the inputs occur during operation of the requested web service or the determination that the second output sequence in which the outputs occur during operation of the existing web service is subsumed by the first output sequence in which the outputs occur during operation of the requested web service is performed by a reasoner selected from the group consisting of a Racer reasoner, a RacerPro reasoner, a Pellet reasoner, a FaCT reasoner, a FaCT++ reasoner, a MSPASS reasoner, a Celebra Engine reasoner, a CEL reasoner, a Jena reasoner, a Jess reasoner, and a KAON2 reasoner.

3. The method of claim 1,
   wherein the description of the requested web service comprises first inputs to the requested web service and the first input sequence of first inputs that occurs during operation of the requested web service,
   wherein the description of the existing web service comprises second inputs to the existing web service and the second input sequence of second inputs that occurs during operation of the existing web service, and further comprising:
      determining, based on logical rules of the description logic, that the first inputs subsume the second inputs; and
      determining, based on logical rules of the description logic, that the second input sequence of second inputs is identical to the first input sequence of first inputs, wherein the second inputs in the second input sequence are equivalent to the first inputs in the first input sequence.

4. The method of claim 1,
   wherein the description of the requested web service comprises first outputs from the requested web service and the first input sequence of first outputs that occurs during operation of the requested web service,
   wherein the description of the existing web service comprises second outputs from the existing web service and the second output sequence of second outputs that occurs during operation of the existing web service, and further comprising:
      determining, based on logical rules of the description logic, that the first outputs subsume the second outputs; and
      determining, based on logical rules of the description logic, that the second output sequence of outputs is identical to the first output sequence of first outputs, wherein the second outputs in the second output sequence are equivalent to the first outputs in the first output sequence.

5. The method of claim 1,
   wherein the description of the requested web service comprises a plurality of first inputs,
   wherein the description of the existing web service comprises a plurality of second inputs, and
   wherein determining that the second input sequence in which the inputs occur during operation of the existing web service is subsumed by the first input sequence in which the inputs occur during operation of the requested web service comprises determining that the plurality of the first inputs includes the plurality of second inputs.

6. The method of claim 1,
wherein the description of the requested web service comprises a plurality of first outputs,
wherein the description of the existing web service comprises a plurality of second outputs, and
wherein determining that the second output sequence in which the outputs occur during operation of the existing web service is subsumed by the first output sequence in which the outputs occur during operation of the requested web service comprises determining that the plurality of the second outputs includes the plurality of first outputs.

7. The method of claim 6,
wherein the description of the requested web service comprises a plurality of first inputs,
wherein the description of the existing web service comprises a plurality of second inputs, and
wherein determining that the second input sequence in which the inputs occur during operation of the existing web service is subsumed by the first input sequence in which the inputs occur during operation of the requested web service comprises:
  determining that the plurality of the first inputs includes the plurality of second inputs; and
  determining that the plurality of the second inputs includes the plurality of first inputs.

8. The method of claim 1, wherein the description logic comprises an OWL Web Ontology Language description logic.

9. The method of claim 1, further comprising receiving the description of the requested web service through a wide area network.

10. The method of claim 1, further comprising:
generating a description logic description of the requested web service in a client.

11. The method of claim 10, wherein receiving the request for the web service comprises:
receiving the description logic description of the requested web service at a reasoner in the client.

12. The method of claim 1, further comprising:
comparing the description of the requested web service to a plurality of descriptions of different existing web services, the descriptions of the different existing web services each including a second input sequence in which inputs to the respective existing web service occur during operation of the respective existing web service and/or a second output sequence in which outputs from the respective existing web service occur during operation of the respective existing web service, wherein the descriptions of the existing web services conform to the description logic;
determining which of the descriptions of the existing web services are subsumed by the description of the requested web service based on the logical rules of the description logic.

13. The method of claim 1,
wherein the description logic comprises an OWL Web Ontology Language description logic,
wherein the description of the requested web service comprises first inputs and first outputs,
wherein the description of the existing web service comprises second inputs and second outputs, and further comprising:
determining that first inputs include the second inputs; and
determining that the second outputs include the first outputs.

14. A system for matching a requested web service with an existing web service, the system comprising one or more processors of a computer system, the one or more processors configured to:
generate a description of a requested web service for a computing service, wherein the description includes a first input sequence in which inputs to the requested web service occur during operation of the requested web service, in an ordering indicated by the first input sequence, and/or including a first output sequence in which outputs from the requested web service occur during operation of the requested web service, in an ordering indicated by the first output sequence, and wherein the description of the requested web service conforms to a description logic;
store a description of a behavior of the existing web service in a repository, wherein the description includes a second input sequence in which inputs to the existing web service occur during operation of the existing web service, in an ordering indicated by the second input sequence, and/or including a second output sequence in which outputs from the existing web service occur during operation of the existing web service, in an ordering indicated by the second output sequence, and wherein the description of the existing web service conforms to the description logic; and
execute a reasoner, the reasoner being coupled to the repository and configured for comparing the description of the requested web service to the description of the existing web service and also configured for determining if the description of the existing web service is subsumed by the description of the requested web service according to logical rules of the description logic;
select the existing web service based on the determination that the second input sequence in which the inputs occur during operation of the existing web service is subsumed by the first input sequence in which the inputs occur during operation of the requested web service or based on the determination that the second output sequence in which the outputs occur during operation of the existing web service is subsumed by the first output sequence in which the outputs occur during operation of the requested web service; and
fulfill the request with the selected existing web service.

15. The system of claim 14, wherein the reasoner is based on a description logic.

16. The system of claim 15, wherein the description logic comprises an OWL Web Ontology Language description logic.

17. The system of claim 15,
wherein the description of the requested web service comprises the first output sequence of first outputs,
wherein the description of the existing web service comprises the second output sequence of second outputs, and
wherein the reasoner is further configured to:
  determine, based on logical rules of the description logic, that the second outputs subsume the first outputs;
  determine, based on logical rules of the description logic, that a sequential order of a set of first outputs in the first output sequence is identical to a sequential order of a set of second outputs in the second output sequence, wherein the sequentially ordered second outputs are equivalent to the sequentially ordered first outputs; and determine, based on logical rules of the description logic, that the second output sequence of outputs is identical to the first output sequence of outputs, wherein the second outputs in the second output sequence are equivalent to the first outputs in the first output sequence.

18. The system of claim 15, further comprising a client adapted to implement functionality provided by the existing web service, wherein the existing web service is provided by a server remotely located from the client and coupled to the client through a computer network.

19. The system of claim 14, wherein the reasoner is selected from the group consisting of a Racer reasoner, a RacerPro reasoner, a Pellet reasoner, a FaCT reasoner, a FaCT++ reasoner, a MSPASS reasoner, a Celebra Engine reasoner, a CEL reasoner, a Jena reasoner, a Jess reasoner, and a KAON2 reasoner.

* * * * *